United States Patent
Jeong et al.

(10) Patent No.: US 9,182,035 B2
(45) Date of Patent: Nov. 10, 2015

(54) SYSTEM FOR CONTROLLING SHIFT OF VEHICLE

(71) Applicants: Hyundai Motor Company, Seoul (KR); Kia Motors Corporation, Seoul (KR)

(72) Inventors: Dong Hoon Jeong, Osan-si (KR); Joseph D. Chang, Yongin-si (KR); Byeong Wook Jeon, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/502,688

(22) Filed: Sep. 30, 2014

(65) Prior Publication Data

US 2015/0149052 A1 May 28, 2015

(30) Foreign Application Priority Data

Nov. 26, 2013 (KR) .................. 10-2013-0144497

(51) Int. Cl.
- G06F 17/00 (2006.01)
- F16H 61/02 (2006.01)
- G01C 21/26 (2006.01)
- F16H 59/66 (2006.01)

(52) U.S. Cl.
CPC ............ *F16H 61/0204* (2013.01); *G01C 21/26* (2013.01); *F16H 59/66* (2013.01); *F16H 2059/666* (2013.01); *F16H 2061/0216* (2013.01)

(58) Field of Classification Search
None
See application file for complete search history.

(56) References Cited

U.S. PATENT DOCUMENTS

| | | | |
|---|---|---|---|
| 6,199,001 B1* | 3/2001 | Ohta et al. | 701/51 |
| 6,220,986 B1* | 4/2001 | Aruga et al. | 477/97 |
| 6,230,083 B1* | 5/2001 | Matsuda et al. | 701/1 |
| 6,516,261 B2* | 2/2003 | Ohashi et al. | 701/51 |
| 6,853,906 B1* | 2/2005 | Michi et al. | 701/521 |
| 8,214,126 B2* | 7/2012 | Miyajima et al. | 701/93 |
| 8,428,843 B2* | 4/2013 | Lee et al. | 701/93 |
| 8,749,370 B2* | 6/2014 | Shinohara et al. | 340/456 |
| 2005/0131642 A1* | 6/2005 | Adachi | 701/210 |
| 2014/0142822 A1* | 5/2014 | LI | 701/55 |

FOREIGN PATENT DOCUMENTS

| | | |
|---|---|---|
| JP | 10-122342 (A) | 5/1998 |
| JP | 3967984 (B2) | 8/2007 |
| JP | 4434101 (B2) | 3/2010 |
| JP | 2012-118871 (A) | 6/2012 |
| KR | 10-2008-0016184 (A) | 2/2008 |
| KR | 10-2010-0058187 (A) | 6/2010 |
| WO | WO 2011/111145 (A1) | 9/2011 |

* cited by examiner

*Primary Examiner* — Dirk Wright
(74) *Attorney, Agent, or Firm* — Morgan, Lewis & Bockius LLP

(57) ABSTRACT

A shift control apparatus for a vehicle may include a GPS sensor detecting a vehicle location, a navigation device outputting short-distance road information and long-distance road information using the vehicle location, a vehicle controller restoring forward road information using the short-distance road information and the long-distance road information, and determining a degree of curve and an average degree of inclination of a road using the forward road information, and a vehicle shifting unit having a shift controller controlling a shift pattern of a transmission using the degree of curve and the average degree of inclination.

10 Claims, 7 Drawing Sheets

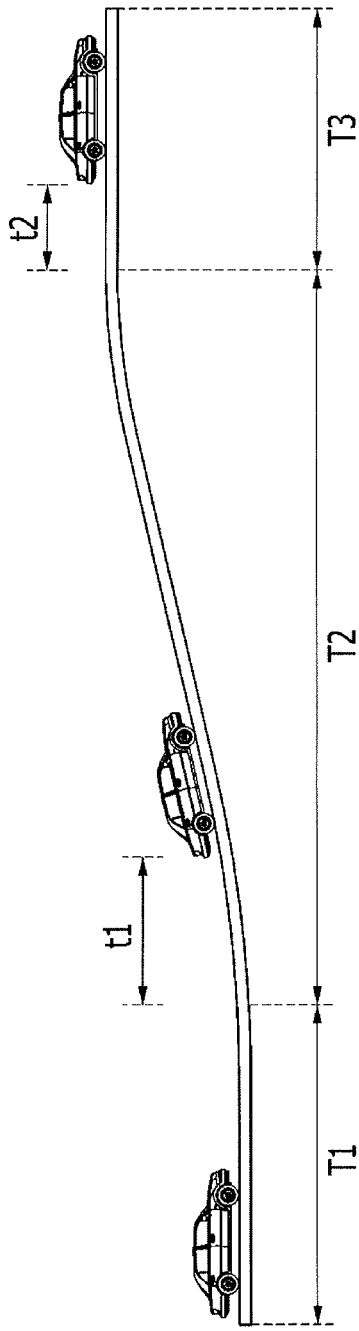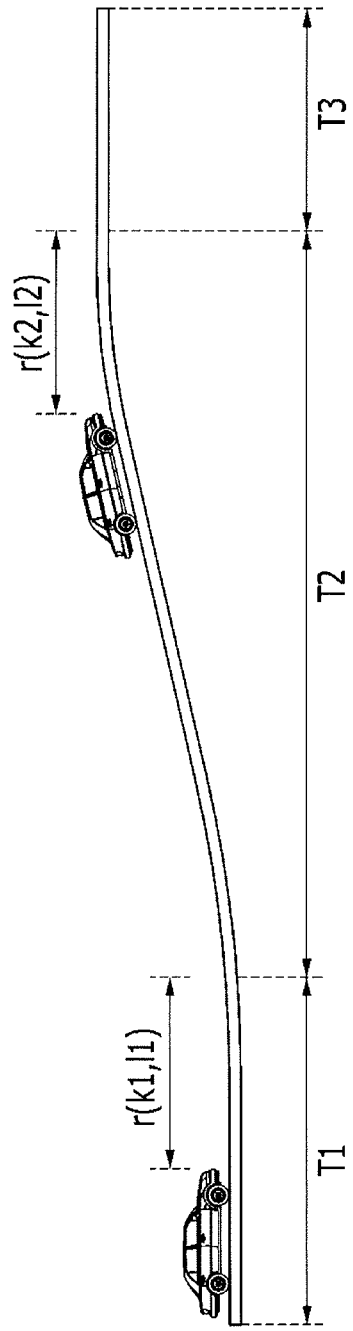

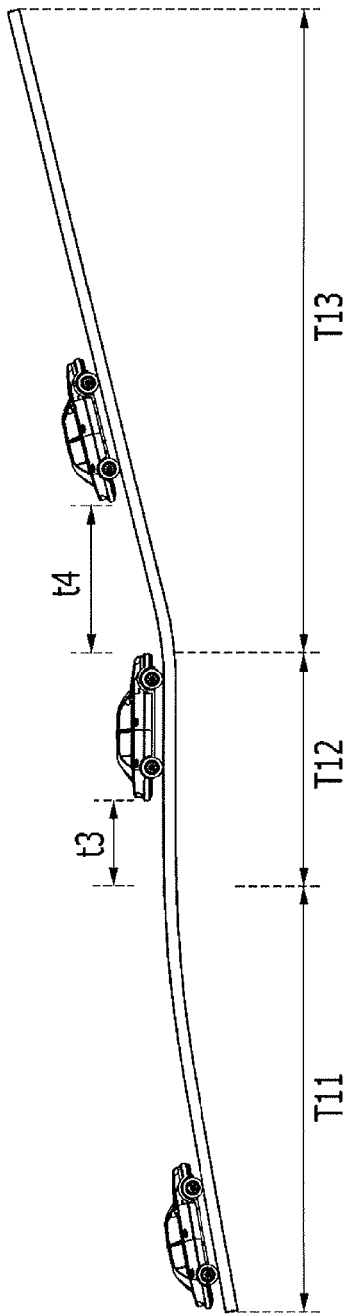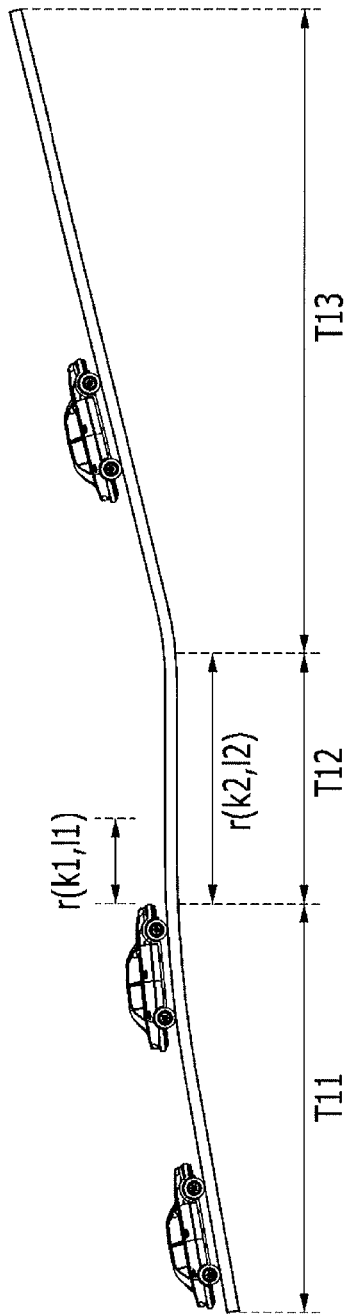

SYSTEM FOR CONTROLLING SHIFT OF VEHICLE

CROSS-REFERENCE TO RELATED APPLICATION

The present application claims priority to and the benefit of Korean Patent Application No. 10-2013-0144497 filed on Nov. 26, 2013, the entire contents of which is incorporated herein for all purposes by this reference.

BACKGROUND OF THE INVENTION

1. Field of the Invention

The present invention relates to a system for controlling a shift of a vehicle. More particularly, the present invention relates to a vehicle shift control apparatus that controls gear shifting of a vehicle by predicting a condition of a driving road by a driver.

2. Description of Related Art

In vehicle driving, satisfaction of a driver related to driving performance of the vehicle depends on how much the vehicle is driven in accordance with the driving tendency of the driver and therefore information on a road is important. However, the driving tendency of the driver may have a difference with reaction of the vehicle because a performance characteristic of the vehicle is set to one performance characteristic with respect to the same vehicle model. Accordingly, the driver may feel dissatisfaction with respect to the driving performance of the vehicle. That is, when a driving tendency of the driver is assessed and gear shifting of the vehicle is controlled according to the driving tendency of the driver, satisfaction of the driver related to the driving performance can be optimized.

Therefore, a method for transmitting and receiving road information and predicting a road shape is used for prediction control of a gear stage of an auto transmission and a driving point of an engine according to a forward road shape to thereby improve drivability and fuel efficiency. In addition, a road (e.g., a road in a city and road in a mountainous area) having a severe curve so that the vehicle cannot be driven in high speed and a smoothly curved road (e.g., an intercity expressway) designed for high speed driving are different from each other in the degree of curve and the degree of inclination, and therefore various types of road information need to be predicted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for shift controlling of a vehicle that can predict a forward road shape by calculating a relative distance, a relative altitude, and a relative rotation angle with respect to a plurality of spots on the road.

In addition, an exemplary embodiment of the present invention provides a shift control apparatus of a vehicle that can prevent mismatch between a substantial road and a shift pattern and iteration of entering and releasing of a gear shift by controlling a shift pattern of an automatic transmission in advance according to a predicted forward road shape.

In an aspect of the present invention, a shift control apparatus for a vehicle, may include a GPS sensor detecting a vehicle location, a navigation device outputting short-distance road information and long-distance road information using the vehicle location, a vehicle controller restoring forward road information using the short-distance road information and the long-distance road information, and determining a degree of curve and an average degree of inclination of a road using the forward road information, and a vehicle shifting unit having a shift controller controlling a shift pattern of a transmission using the degree of curve and the average degree of inclination.

The navigation device sets a plurality of spots that are separated from each other with a regular interval on the road, and outputs a relative distance with respect to a first direction between the plurality of spots, a relative distance with respect to a second direction that is perpendicular to the first direction, and a relative altitude as the short-distance road information and the long-distance road information.

The vehicle controller detects a driving direction of the vehicle using the relative distance with respect to the first and second directions, and determines the degree of curve and the degree of inclination using the driving direction of the vehicle.

The vehicle controller determines the degree of curve according to a relative angle formed by a driving direction of the vehicle with respect to a first spot and a driving direction of the vehicle with respect to a second spot among the plurality of spots.

The degree of curve $c(i, j)$ of the second spot (j) at the first spot (i) is defined as given in an equation of $$c(i, j) = \cos^{-1}\left(\frac{v(i) \cdot v(j)}{|v(i)||v(j)|}\right)[\text{rad}],$$

where the v(i) denotes the driving direction of the vehicle with respect to the first spot (i) and the v(j) denotes the driving direction of the vehicle with respect to the second spot (j).

The vehicle controller determines a direction of curve according to a sign of the relative angle as given in an equation of $$\text{sign}(c(i,j)) = \text{sign}(v(i) \times v(j)).$$

An average degree of inclination $r(i, j)$ between the first spot (i) and the second spot (j) is defined as given in an equation of $$r(i, j) = 100 \times \sqrt{\frac{\left(\sum_{k=i}^{j} hr(k)\right)^2}{\left(\sum_{k=i}^{j} dr\right)^2 - \left(\sum_{k=i}^{i} hr(k)\right)^2}} \ [\%]$$

where, the hr denotes a relative altitude between the first spot (i) and the second spot (j) and the dr denotes a distance between the first spot (i) and the second spot (j).

An average degree of inclination of the road corresponding to the current vehicle location is defined as given in an equation of $$r(1, 1) = 100 \times \sqrt{\frac{hr(1)^2}{dr^2 - hr^2}} \ [\%].$$

The vehicle shifting unit may include a memory unit storing a lookup table including gear stage information corresponding to the degree of curve and a speed of the vehicle, information of a gradient program to which a first shift pattern that corresponds to the average degree of inclination is programmed, and information on a shift program to which a second shift pattern that corresponds to operation of an acceleration pedal and a brake pedal of the vehicle is programmed, and the shift controller controlling the transmission by extracting a gear stage from at least one of the lookup table, the gradient program information, and the shift program information according to the determined degree of curve and the average degree of inclination.

The shift controller selects a lowest gear stage when an extracted gear stages are different from each other.

According to the exemplary embodiment of the present invention, a forward road shape can be predicted without a complex calculation process by calculating the degree of curve and the degree of inclination of a road using a relative distance, a relative altitude, and a relative rotation angle with respect to a plurality of spots on the road.

In addition, according to the exemplary embodiment of the present invention, mismatch between a substantial road and a shift pattern and iteration of entering and releasing of a gear shift can be prevented by controlling a shift pattern of an automatic transmission in advance according to a predicted forward road shape.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5A and FIG. 5B show a case of control of a shift pattern by predicting the degree of inclination of a road according to the exemplary embodiment of the present invention.

FIG. 6A and FIG. 6B show another case of control of a shift pattern by predicting the degree of inclination of a road according to the exemplary embodiment of the present invention.

Figure 1:
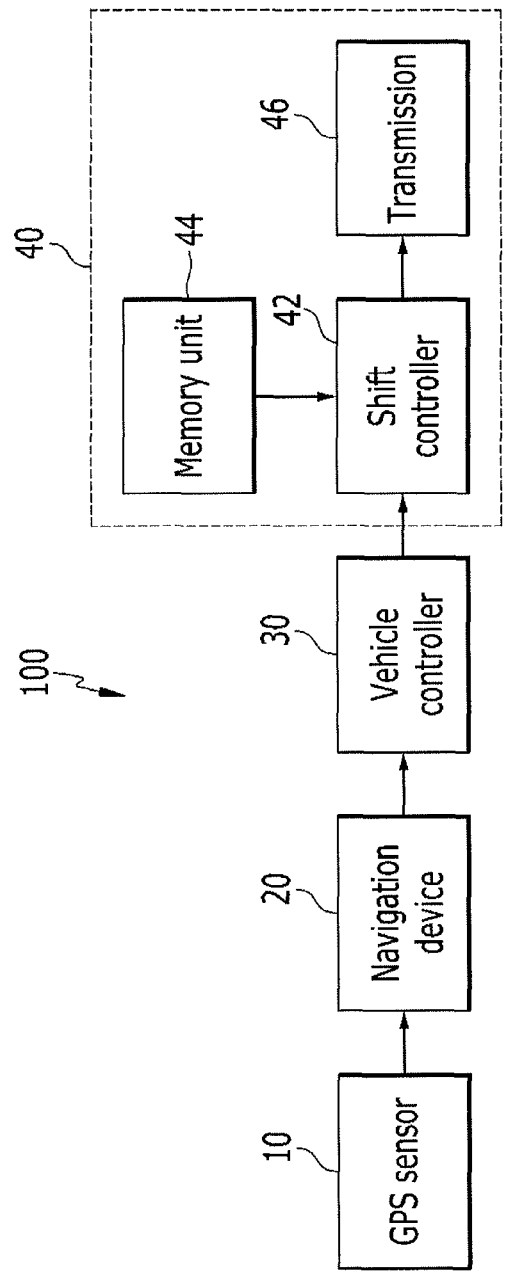
FIG. 1 is a block diagram of a vehicle transmission controller according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically or mechanically coupled" to the other element through a third element. In addition, unless explicitly described to the contrary, the word "comprise" and variations such as "comprises" or "comprising", will be understood to imply the inclusion of stated elements but not the exclusion of any other elements.

Hereinafter, the present invention will be described more fully hereinafter with reference to the accompanying drawings, in which exemplary embodiments of the invention are shown.

FIG. 1 is a block diagram of a shifting control apparatus of a vehicle according to an exemplary embodiment of the present invention.

Referring to FIG. 1, a shift control system 100 for a vehicle according to the exemplary embodiment of the present invention includes a global position system (GPS) sensor 10, a navigation device 20, a vehicle controller 30, and a vehicle shifting unit 40. Here, the GPS sensor 10 outputs location information and speed information of a vehicle.

The GPS sensor 10 calculates distance information and time information from three or more satellites and applies trigonometry to the calculated information to accurately calculate current location information based on the latitude, the longitude, and the altitude. In addition, the GPS sensor 10 calculates location information and time information using three satellites, and may correct an error in the calculated location and time information using another one satellite. Also, the GPS sensor 10 may calculate information regarding a speed of a vehicle by continuously calculating a current location of the vehicle in real time.

The navigation device 20 provides a driver with information on a route to a destination, and outputs forward road information S by mapping a current location of the vehicle and pre-stored map information through communication with the GPS sensor 10.

Here, the navigation device 20 may output three-dimensional coordinate information with respect to each of a plurality of spots that are separated from each other with a constant gap from a reference location to shorter than a target location in a front side as short-distance road information Sn on a substantial road using the current location information and speed information.

In addition, the navigation device 20 may output three-dimensional coordinate information with respect to each of a plurality of spots that are separated from each other with a constant gap from a reference location to farther than a target location in a front side as long-distance road information Sf. For example, the short-distance road information Sn may include three-dimensional coordinate information with respect to five spots that are separated from each other with an interval of 10 meter in a driving direction of the vehicle, and the long-distance road information Sf may include three-dimensional coordinate information with respect to five spots that are separated from each other with an interval of 100 meter in the driving direction of the vehicle.

Here, in the three-dimensional coordinate information, a location of a front side n-th spot d(n) from the reference spot is set as a relative distance pn from an (n−1)th spot d(n−1) and the relative distance p(n) is defined by an east-west directional relative distance ew(n), a north-south directional relative distance ns(n), and a relative altitude h(n).

The vehicle controller 30 receives the short-distance road information sn and the long-distance road information Sf through communication with the navigation device 20, and restores forward road information S using the received short-distance road information Sn and the long-distance road information Sf. The vehicle controller 30 may be a transmission control unit (TCU), but it is not restrictive.

In addition, the vehicle controller 30 divides a route from the reference location to (d) spot in a front side by a constant distance (r), and include forward road information with respect to each of n spots s(1) to s(n) such as forward road information with respect to a location of a first spot s(1) that is separated by the constant distance (r) from the reference location and forward road information with respect to a second spot s(2) that is separated by the constant distance (r) from the location of the first spot. That is, the forward road information S may be represented as a set of forward road information with respect to each of the n spots s(1) to s(n). The constant distance r may be a distance that can equally divide a distance from the reference location to the d spot.

In detail, the forward road information s(j) with respect to the j-th spot d(j) includes a distance da(j) from a reference spot to the j-th spot s(j), a distance (i.e., a relative distance dr between da(j−1) and da(j)) from the j-th spot s(j) to the (j−1)th spot s(j−1), an east-west directional relative distance ewr(j) with respect to the j-th spot s(j) at the (j−1)th spot s(j−1), a north-south directional relative distance nsr(j) with respect to the j-th spot s(j) at the (j−1)th spot s(j−1), and a relative altitude hr(j) with respect to the j-th spot s(j) at the (j−1)th spot s(j−1).

In addition, the vehicle controller 30 calculates the degree of curve and the degree of inclination of a forward road using the forward road information with respect to each of the spots s(1) to s(n), and controls the vehicle shifting unit 40 according to the calculated degree of curve and degree of inclination. Here, the vehicle controller 30 calculates a vehicle driving direction and the degree of inclination of the road at a current location, the degree of inclination of the road at spot L s(L) in a front side, the degree of curve of the road of the spot L s(L) with respect to spot K (sK), and an average degree of inclination between s(K) and s(L) in a front side.

In detail, the east-west directional distance ewr(j) and the north-south directional distance nsr(j) form a two-dimensional coordinate system that indicates a relative location from the (j−1)th spot to s(j−1) to the j-th spot s(j) by setting (j−1)th spot as an original spot. Therefore, a difference v(j) between a location vector X(j−1) to the (j−1)th spot s(j−1) and a location vector X(j) to the j-th spot s(j) from a current location of the vehicle is v(j)=(ewr(j), nsr(j).

That is, a vehicle driving direction at the j-th spot is defined by v(j), and the vehicle controller 30 according to the exemplary embodiment of the present invention calculates the degree of curve and the degree of inclination using v(j). For example, the degree of curve c(i,j) at the i-th spot s(i) is defined by an angle formed by a vehicle driving direction at the i-th spot s(i) and a vehicle driving direction at the j-th spot s(j) as shown in Equation 1.

$$c(i,\ j) = \cos^{-1}\left(\frac{v(i) \cdot v(j)}{|v(i)||v(j)|}\right)[\text{rad}] \qquad \text{[Equation 1]}$$

Here, as shown in Equation 2, the vehicle controller 30 defines a direction of curve according to a sign (−, +) of a relative angle.

$$\text{sign}(c(i,j))=\text{sign}(v(i) \times v(j)) \qquad \text{[Equation 2]}$$

Figure 2:
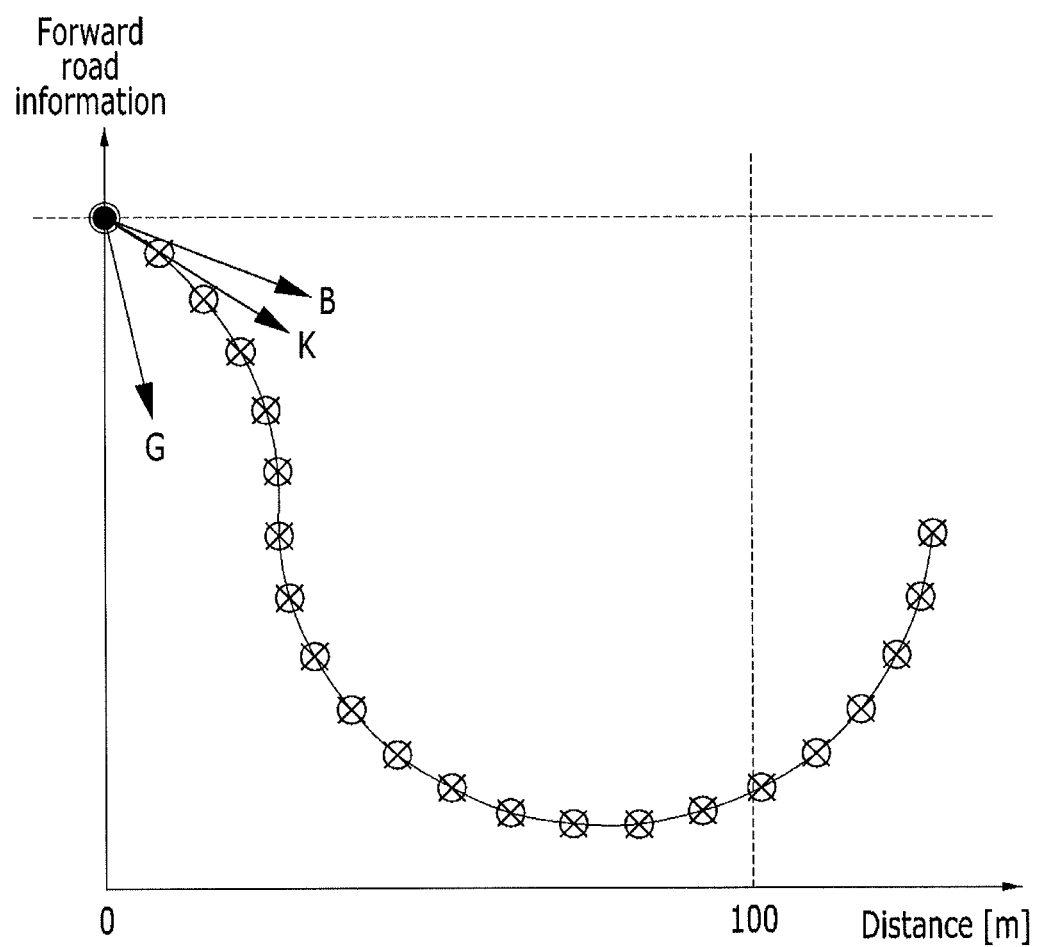
FIG. 2 is an exemplary graph illustrating a continuously curved road.

For example, as shown in FIG. 2, a road that is continuously curved with about 50 m interval is exemplarily represented with forward road information with 10 m interval. Here, when a vehicle driving direction at the current spot s(k), a vehicle driving direction at a spot s(g) at 50 m front, a vehicle driving direction s(b) at 100 m front are respectively calculated as K, G, and B, the vehicle controller 30 determines a swirl angle at each of the spot s(g) 50 m front and the spot s(b) of 100 m front. In addition, since the degree of curve of K with respect to G is "−" and the degree of curve of G with respect to B is "+", the vehicle controller 30 can determine the corresponding road is a road that is continuously curved with 50 m interval.

That is, the vehicle controller 30 according to the exemplary embodiment of the present invention calculates a rotation radius of a road using a relative rotation angle formed by vehicle driving directions at two spots. In this case, the calculation process is simple compared to a case of calculating a value of a cubic simultaneous equation using location information on at least three spots.

In addition, an average degree of inclination between the i-th spot s(i) and the j-th spot s(j) can be defined as given in Equation 3.

$$r(i,\ j) = 100 \times \sqrt{\frac{\left(\sum_{k=i}^{j} hr(k)\right)^2}{\left(\sum_{k=i}^{j} dr\right)^2 - \left(\sum_{k=i}^{i} hr(k)\right)^2}}\ [\%] \qquad \text{(Equation 3)}$$

Since a value cannot be defined at a current location of the vehicle, i.e., j=0, a current driving direction v(0) of the vehicle is calculated by defining j=1. That is, v(0)=v(1)=(ewr 1, nsr 1). In this case, the degree of inclination of the current location is r(1, 1), and can be acquired as given in Equation 4.

$$r(1,\ 1) = 100 \times \sqrt{\frac{hr(1)^2}{dr^2 - hr^2}}\ [\%] \qquad \text{(Equation 4)}$$

In addition, the degree of road inclination at spot L s(L) in a front side is r(l, 1) from (i, j)=(l, 1). The degree of road curve of the spot L s(L) with respect to the spot K s(K) in a front side is c(k,l) from (i, j)=(k, 1), and an average degree of inclination between the spot K s(K) and the spot L s(L) in a front side is r(k, 1) from (i, j)=(k, 1).

Figure 3:
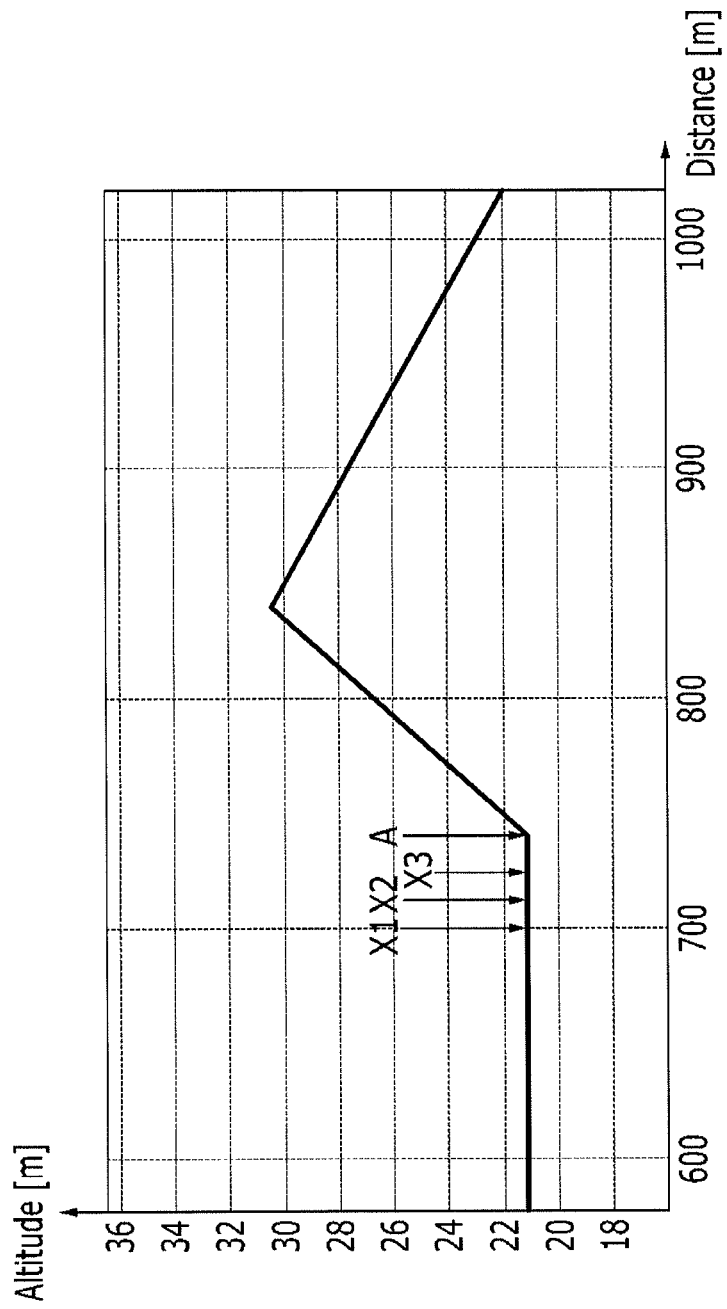
FIG. 3 is an exemplary graph illustrating an inclined road.

For example, as shown in FIG. 3, a case that the degree of road inclination at a current location X1 is 0% and the degree of road inclination at a spot A 50 m ahead is about 8.44% will be exemplarily described. In this case, when an average degree of inclination from the current location X1 to the spot A 50 m ahead is about 1.41%, it can be determined that inclination of the corresponding road starts from the spot 50 m ahead.

In this condition, when the vehicle moves to a location X2 by driving 10 m per unit time, the average degree of inclination is increased to about 3.52%, and when the vehicle moves to a location X3 by driving again, the average degree of inclination is increased to about 4.92%. That is, the vehicle controller 30 calculates the degree of road inclination at the spot A 50 m ahead and the average degree of inclination between the current vehicle location and the 50 m ahead spot A to predict an inclination start point of the corresponding road by using the calculated values.

The vehicle controller 30 according to the exemplary embodiment of the present invention converts a discontinuously changed degree of inclination into a continuously changed average degree of inclination by calculating an average degree of inclination between two spots rather than calculating the degree of inclination of a specific spot to thereby predict a geographical feature of a road. In addition, the vehicle controller 30 uses a relative distance and a relative altitude for calculation and therefore an additional calculation process of a location vector for prediction of geographical features of a road can be omitted.

The vehicle shifting unit 40 is controlled by the vehicle controller 30 and automatically controls a shift pattern. In detail, the vehicle shifting unit 40 includes a shift controller 42, a memory unit 44, and a transmission 46. The shift controller 42 requests shift control to the vehicle controller 30 if shift control is necessary according to vehicle movement.

In addition, the shift controller 42 extracts a gear stage from the memory unit 33 according to the degree of curve (c) and an average degree of inclination (r) calculated from the vehicle controller 30, and controls gear shift of the transmission 46 according to the extracted gear stage. Here, the shift controller 42 may shift to the lowest gear level when gears respectively corresponding to the degree of curve (c) and the average degree (r) of inclination are different from each other.

The memory unit 44 stores a lookup table (LUT) including gear stage information corresponding to the degree of curve (c) and vehicle speed, information on a gradient program in which a shift pattern corresponding to the average degree of inclination (r) is programmed, and information on shift program in which a shift pattern corresponding to operation of an acceleration pedal and a brake pedal is programmed.

Figure 4:
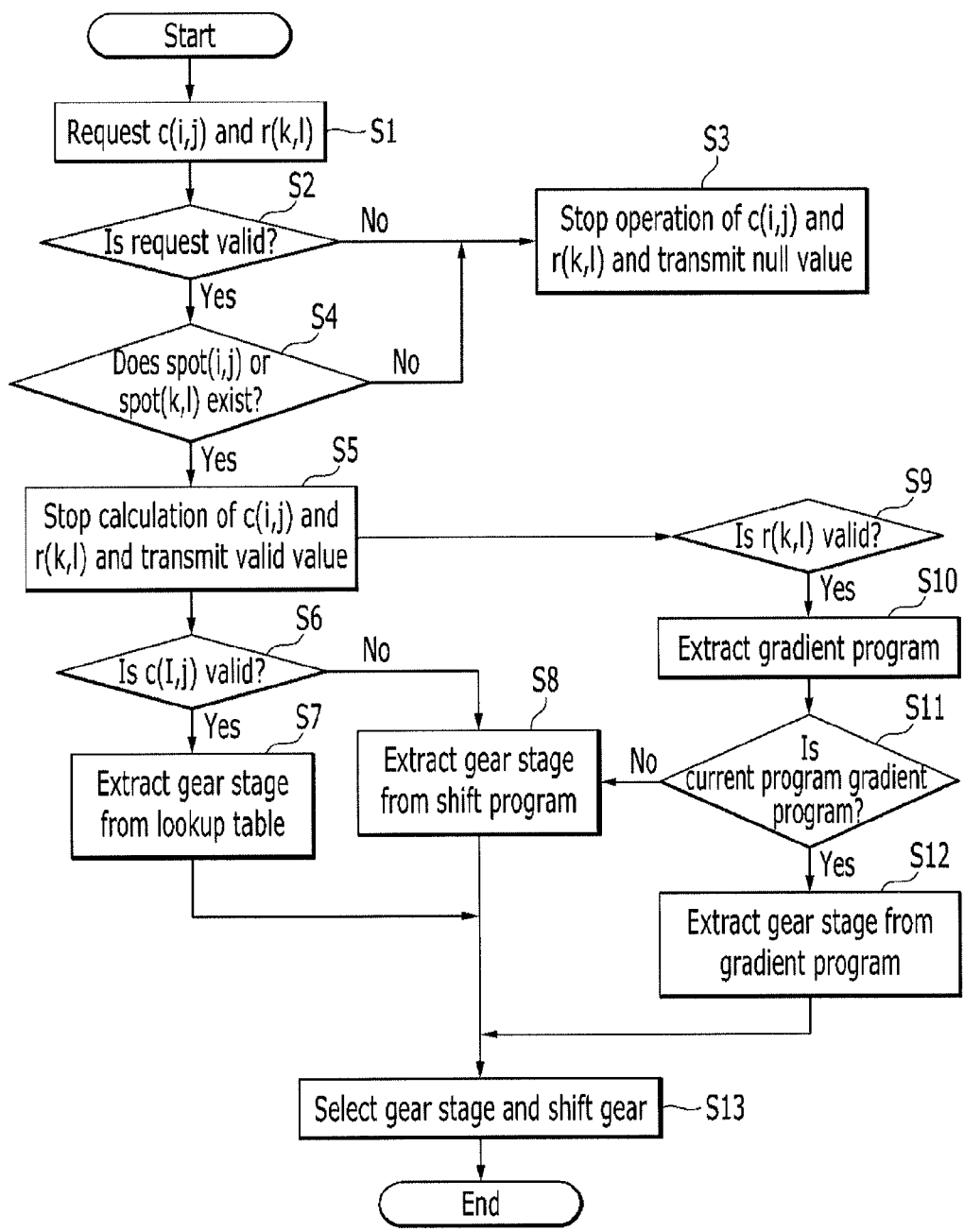
FIG. 4 is a flowchart of a method for controlling gear shifting using the vehicle transmission controller according to the exemplary embodiment of the present invention.

FIG. 4 is a flowchart of a method for controlling gear shift using the vehicle shift control apparatus according to the exemplary embodiment of the present invention.

Referring to FIG. 4, the shift controller 42 requests the vehicle controller 30 control a shift if the shift control is necessary according to vehicle movement. In detail, the shift controller 42 requests the degree of curve c(i, j) and an average degree of inclination r(k, l) with respect to a random spot that needs to be predicted (S1).

For example, the shift controller 42 requests the degree of curve c (i1, j1) between the i1-th spot s(i1) and the j1-th spot s(j1), the degree of curve c (i2, j2) between the i2-th spot s(i2) and the j2-th spot s(j2), an average degree of inclination r(k1, l1) between the k1-th spot s(k1) and the l1-th spot s(l1), and an average degree of inclination r(k2, l2) between the k2-th spot s(k2) and the l2-th spot s(l2). Here, the it and the k1 may be the same spot or may be different from each other.

Next, the vehicle controller 30 determines whether the request for the degree of curve c(i, j) and the average degree of inclination r(k, l) is valid (S2). For example, when no information with respect to a specific spot is input from the GPS sensor 10 or communication with the navigation device 20 is not normally performed and thus the degree of curve c(i,j) and an average degree of inclination r(k,l) for the spot cannot be calculated, the vehicle controller 30 determines that the request with respect to the specific spot is invalid.

When the request for the degree of curve c(i,j) and the average degree of inclination r(k,l) are determined to be invalid, the vehicle controller 30 stops calculation of the degree of curve c(i,j) and the average degree of inclination r(k,l) and transmits an invalid value indicating that the corresponding request is invalid (S3).

On the other hand, when the request for the degree of curve c(i, j) and the average degree of inclination r(k, l) is valid, the vehicle controller 30 determines whether a combination of the corresponding spot exists (S4). That is, the vehicle controller 30 determines whether forward road information with respect to the i1-th spot s(i1) and the j1-th spot s(j1) to be predicted.

If a combination of the corresponding spot exists, the vehicle controller 20 calculates the degree of curve c(i, j) and the average degree of inclination r(k, l), and transmits a valid value which is a calculation result to the shift controller 42 (S5). If no combination of the corresponding spot exists, the step S3 is performed.

Next, the shift controller 42 determines whether the requested value of the degree of curve c(i, j) is valid (S6). For example, the shift controller 42 determines whether the value of the corresponding degree of curve c(i, j) exists in the lookup table LUT of the memory unit 44, and if exists, the degree of curve c(i, j) can be determined to be valid.

If the degree of curve c(i, j) is valid, the shift controller 42 extracts a gear stage from the lookup table LUT corresponding to the current speed of the vehicle and the value of the degree of curve c(i, j) (S7). For example, the shift controller 42 may extract a gear stage corresponding to the degree of curve c(i1, j1) and the current vehicle speed as the first gear stage G1, and may extract a gear stage corresponding to the degree of curve c(i2, j2) and the current vehicle speed as the second gear stage G2.

Meanwhile, the result of the determination in step S6 shows that the value of the degree of curve c(i, j) is invalid, the shift controller 42 extracts a gear stage from information on a shift program to which a shift pattern corresponding to acceleration pedal and brake pedal is programmed (S8).

The shift controller 42 determines whether the requested average degree of inclination r(k, l) is valid (S9). For example, the shift controller 42 may determine the value of the corresponding average degree of inclination r(k, l) is valid of the average degree of inclination r(k, l) is programmed to the gradient program information of the memory unit 44.

If the average degree of inclination r(k, l) is determined to be valid, the shift controller 42 extracts a gradient program corresponding to the average degree of inclination r(k, l) (S10). For example, the shift controller 42 may extract a gradient program P1 corresponding to the average degree of inclination r(k1, l1) and may extract a gradient program P2 corresponding to the average degree of inclination r(k2, l2).

On the other hand, if the average degree of inclination r(k, l) is determined to be invalid, the shift controller 42 performs the step S8.

Next, the shift controller 42 determines whether a current program is a gradient program (S11), and extracts a gear stage programmed by the gradient program if the current program is the gradient program (S12). On the other hand, when the current program is determined not to be the gradient program in step S11, the shift controller 42 performs the step S8.

Next, the shift controller 42 controls the transmission 46 by selecting the lowest gear stage among gear stages extracted from the respective steps S7, S8, and S12 (S13).

FIG. 5A and FIG. 5B show a comparative example that a shift pattern is controlled by predicting the degree of curve of a road according to the exemplary embodiment of the present invention. FIG. 5A shows an exemplary case that the exemplary embodiment of the present invention is not applied, and FIG. 5B shows the exemplary embodiment of the present invention.

Referring to FIG. 5A, a substantial road includes a first flatland section T1, a gradient section T2, and a second flatland section T3. In case of the comparative example, a forward road cannot be predicted, and inclination is sensed when the vehicle enters the gradient section T2 and runs for a predetermined section.

That is, since a gear stage of the transmission 46 is controlled after delayed for a predetermined time period t1 after entering the gradient section T2, gear shift of the vehicle is maintained during running in the first flatland section T1 for the predetermined time period t1 so that a shift pattern is mismatched with the substantial road.

In addition, when the vehicle enters the second flatland section T3 from the gradient section T2, the gear stage of the transmission 46 is controlled after delayed for a predetermined time period t2 after entering the second flatland section T3. Accordingly, the gear shift of the vehicle is maintained while running in the gradient section T2 for the predetermined time period t2 so that a shift pattern is mismatched with the substantial road.

Referring to FIG. 5B, in the exemplary embodiment of the present invention, the average degree of inclination r(k1,11) is calculated using forward road information with respect to a current spot s(k1) of the vehicle and a random spot s(11) while the vehicle is running the first flatland section T1 to sense inclination of the road, and the transmission 46 is controlled in advance with a shift pattern that is appropriate to the gradient section T2 before entering the gradient section T2.

In addition, when the vehicle enters the second flatland section T3, the transmission 46 is controlled with a shift pattern that is appropriate to the second flatland section T3 before entering the second flatland section T3. Therefore, the shift patterns are matched with the substantial road, thereby improving satisfaction of a driver.

FIG. 6A and FIG. 6B show another case that controls a shift pattern by predicting the degree of inclination of a road according to the exemplary embodiment of the present invention. FIG. 6A illustrates a comparative example that the exemplary embodiment of the present invention is not applied, and FIG. 6B illustrates the exemplary embodiment of the present invention.

Referring to FIG. 6A, a substantial road includes a first gradient section T11, a flatland section T12, and a second gradient section T13. In the comparative example, a vehicle enters the flatland section T12 and a gear stage of the transmission 46 is controlled after being delayed for a predetermined time period t3. In addition, the vehicle enters the second gradient section T13 and the gear stage of the transmission 46 is controlled after being delayed for a predetermined time period t4.

Referring to FIG. 6B, while the vehicle is running the first gradient section T11, an average degree of inclination r(k11, l11) is calculated using forward road information between a current vehicle spot s(k11) and a random spot k(l11) to sense inclination of the road.

In this case, in the exemplary embodiment of the present invention, the average degree of inclination r(k11, i12) using forward road information with respect to two or more spots, for example, s(l120 rather than one spot to sense inclination of the road.

That is, the flatland section T12 is relatively short, and the second gradient section T13 is sensed in advance when the vehicle entering the flatland section T12 so that the transmission 46 is maintained with a shift pattern of the first gradient section T11 in the flatland section T12 rather than being changed to a shift pattern of the flatland section T12. Accordingly, gear shift can be prevented from being unnecessarily repeated.

Figure 7:
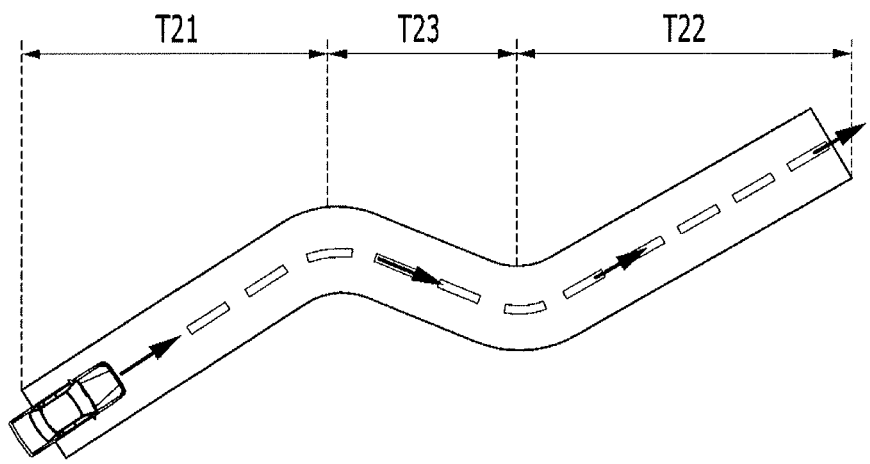
FIG. 7 shows a case of control of a shift pattern by predicting a gradient of a road according to the exemplary embodiment of the present invention.

FIG. 7 shows a comparative example of controlling a shift pattern by predicting the degree of gradient of a road according to the exemplary embodiment of the present invention.

Referring to FIG. 7, in the comparative example, when driving the vehicle in a continuously curved road, a driver reduces the speed of the vehicle when entering a swirling section. For the de-acceleration, when the driver controls the brake pedal instead of stepping on an accelerator pedal, the gear stage of the transmission 46 is shifted up to the eighth gear from the sixth gear and thus the vehicle speed is decreased. In addition, when the driver steps on the acceleration pedal again after entering the swirling section, the gear stage is shifted down to the sixth gear from the eighth gear in a section T22 so that the vehicle speed is increased.

On the other hand, in the exemplary embodiment of the present invention, the first curved road is predicted before entering the swirling section so that the gear stage of the transmission 46 is shifted to the fifth gear from the sixth gear in a section T21 so that the vehicle speed is decreased. In addition, the second curved road is predicted when entering the swirling section to prevent gear shift to a higher gear stage in a section T23 and the gear is shifted up to the sixth gear from the fifth gear during the section T22 so that the vehicle speed is increased.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A shift control apparatus for a vehicle, comprising:
   a GPS sensor detecting a vehicle location;
   a navigation device outputting short-distance road information and long-distance road information using the vehicle location;
   a vehicle controller restoring forward road information using the short-distance road information and the long-distance road information, and determining a degree of curve and an average degree of inclination of a road using the forward road information; and a vehicle shifting unit having a shift controller controlling a shift pattern of a transmission using the degree of curve and the average degree of inclination.

2. The shift control apparatus of claim 1, wherein the navigation device sets a plurality of spots that are separated from each other with a regular interval on the road, and outputs a relative distance with respect to a first direction between the plurality of spots, a relative distance with respect to a second direction that is perpendicular to the first direction, and a relative altitude as the short-distance road information and the long-distance road information.

3. The shift control apparatus of claim 2, wherein the vehicle controller detects a driving direction of the vehicle using the relative distance with respect to the first and second directions, and determines the degree of curve and the degree of inclination using the driving direction of the vehicle.

4. The shift control apparatus of claim 3, wherein the vehicle controller determines the degree of curve according to a relative angle formed by a driving direction of the vehicle with respect to a first spot and a driving direction of the vehicle with respect to a second spot among the plurality of spots.

5. The shift control apparatus of claim 4, wherein the degree of curve c(i, j) of the second spot (j) at the first spot (i) is defined as given in an equation of $$c(i, j) = \cos^{-1}\left(\frac{v(i) \cdot v(j)}{|v(i)||v(j)|}\right)[\text{rad}]$$

where the v(i) denotes the driving direction of the vehicle with respect to the first spot (i) and the v(j) denotes the driving direction of the vehicle with respect to the second spot (j).

6. The shift control apparatus of claim 5, wherein the vehicle controller determines a direction of curve according to a sign of the relative angle as given in an equation of $$\text{sign}(c(i,j)) = \text{sign}(v(i) \times v(j)).$$

7. The shift control apparatus of claim 4, wherein an average degree of inclination r(i, j) between the first spot (i) and the second spot (j) is defined as given in an equation of $$r(i, j) = 100 \times \sqrt{\frac{\left(\sum_{k=i}^{j} hr(k)\right)^2}{\left(\sum_{k=i}^{j} dr\right)^2 - \left(\sum_{k=i}^{i} hr(k)\right)^2}} \ [\%]$$

where, the hr denotes a relative altitude between the first spot (i) and the second spot (j) and the dr denotes a distance between the first spot (i) and the second spot (j).

8. The shift control apparatus of claim 7, wherein an average degree of inclination of the road corresponding to the current vehicle location is defined as given in an equation of $$r(1, 1) = 100 \times \sqrt{\frac{hr(1)^2}{dr^2 - hr^2}} \ [\%].$$

9. The shift control apparatus of claim 1, wherein the vehicle shifting unit comprises:

a memory unit storing a lookup table including gear stage information corresponding to the degree of curve and a speed of the vehicle, information of a gradient program to which a first shift pattern that corresponds to the average degree of inclination is programmed, and information on a shift program to which a second shift pattern that corresponds to operation of an acceleration pedal and a brake pedal of the vehicle is programmed; and the shift controller controlling the transmission by extracting a gear stage from at least one of the lookup table, the gradient program information, and the shift program information according to the determined degree of curve and the average degree of inclination.

10. The shift control apparatus of claim 9, wherein the shift controller selects a lowest gear stage when an extracted gear stages are different from each other.

* * * * *